March 25, 1930.  H. A. SMITH  1,752,116
COOLING FLUID CONTROL
Filed March 11, 1926  3 Sheets-Sheet 1

Inventor
Herbert A. Smith.
By his Attorneys
Edwards Sager + Power

March 25, 1930.  H. A. SMITH  1,752,116
COOLING FLUID CONTROL
Filed March 11, 1926   3 Sheets-Sheet 2

Inventor
Herbert A. Smith.
By his Attorneys
Edwards, Sager & Bower

March 25, 1930.   H. A. SMITH   1,752,116
COOLING FLUID CONTROL
Filed March 11, 1926   3 Sheets-Sheet 3

Inventor
Herbert A. Smith
By his Attorneys
Edwards, Sager + Bower

Patented Mar. 25, 1930

1,752,116

UNITED STATES PATENT OFFICE

HERBERT A. SMITH, OF BETHLEHEM, PENNSYLVANIA, ASSIGNOR TO SARCO COMPANY, INC., A CORPORATION OF NEW YORK

COOLING-FLUID CONTROL

Application filed March 11, 1926. Serial No. 93,862.

This invention relates to the control of the flow of fluids, and particularly to the control of such flow in response to changes in temperature.

An important application of my invention is the control of the flow of water or other cooling medium for an internal combustion engine. Where external radiators are employed in a cooling system, the radiator receives heated water from the engine through one passage and returns the water, which has been cooled in the radiator, to the engine through another passage. In the specific application of my invention to a system of this character, I provide a by-pass through which water may flow directly from one of these passages to the other without passing through the radiator. The flow of water through the by-pass and the flow to the radiator are controlled by a temperature regulated valve which operates in such a way that when the engine is cold, the water flowing from the engine is returned through the by-pass directly to the engine without passing through the radiator, and when the engine has become heated, the by-pass is closed and water from the engine passes through the radiator. With the by-pass open, heated water flowing therethrough returns to the engine without being cooled. As a result, the engine becomes heated to the temperature at which it operates most effectively more quickly than if the water at this time were permitted to flow through the radiator.

I prefer to operate the controlling valve in response to the temperature of the cooling medium as it comes from the engine and for this purpose, I have provided an improved valve which is automatically controlled by a thermostat, preferably of the metallic bellows type, which is located in the water outlet passage from the engine. Special provision is also made in case of the breaking of the thermostat or leaking of the thermostat liquid where a metallic bellows thermostat is employed, for the automatic movement of the valve to a position to close the by-pass and open the passage from the engine to the radiator, and so insure against the possibility of the engine becoming overheated.

Among the other objects of my invention is to provide an improved system for and method of controlling the cooling fluid as above described, and a further object is to provide an improved valve adapted to be used in such a system which valve is simple in construction, strong, durable and efficient in operation. Other objects and advantages of my invention will appear from the following description taken in connection with the accompanying drawing, wherein Fig. 1 is a schematic view of an internal combustion engine cooling system embodying one form of my invention.

Figure 1:
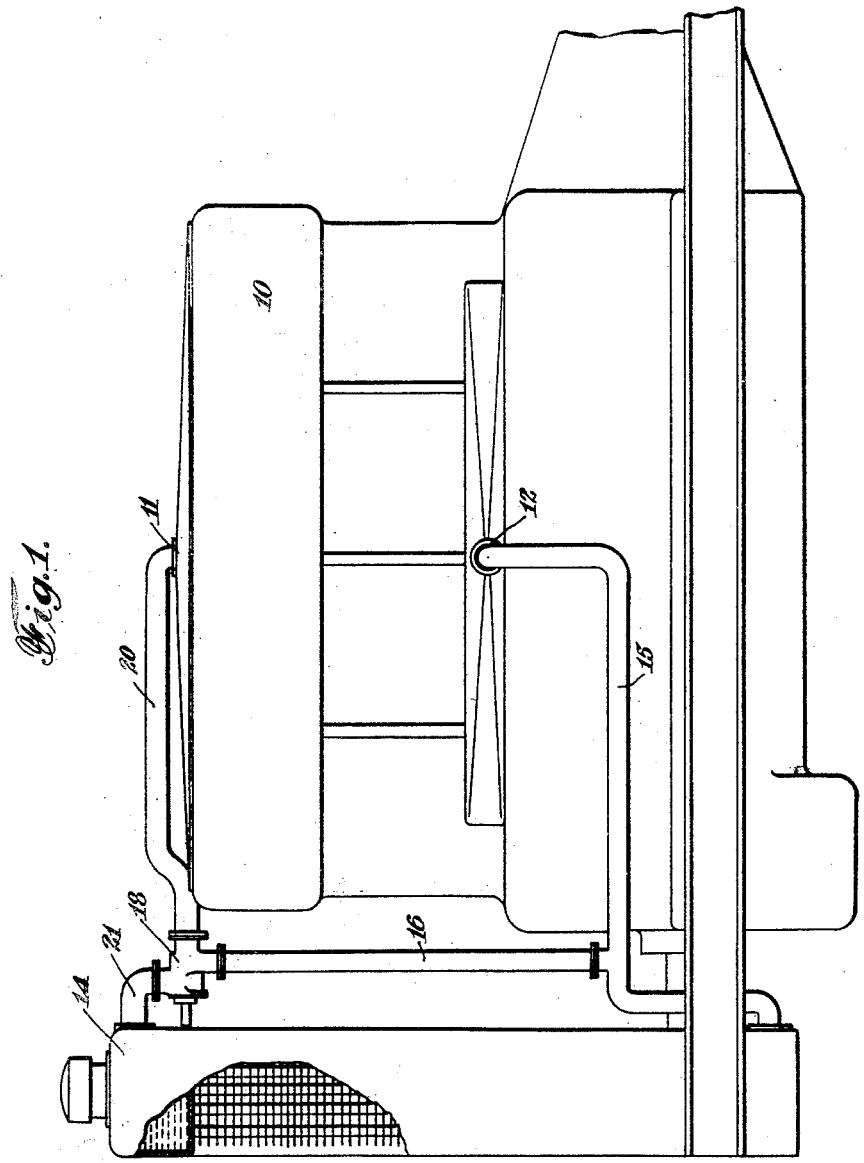

Referring to Fig. 1, 10 represents a water jacketed internal combustion engine, provided with a water outlet 11, and a water inlet 12; and 14 represents a radiator adapted to receive heated water from the outlet 11 and return the same to the inlet 12 through pipe 15. 16 represents a by-pass pipe which communicates at one end with the pipe 15 and at the other end with the valve 18.

Valve 18 together with pipes 20 and 21, as shown, form a passage from the outlet 11 of the engine jacket to the radiator. It will be seen that all water leaving the engine must flow through the valve 18 whether this water goes to the radiator or is returned to the engine through the by-pass 16.

Figure 2:
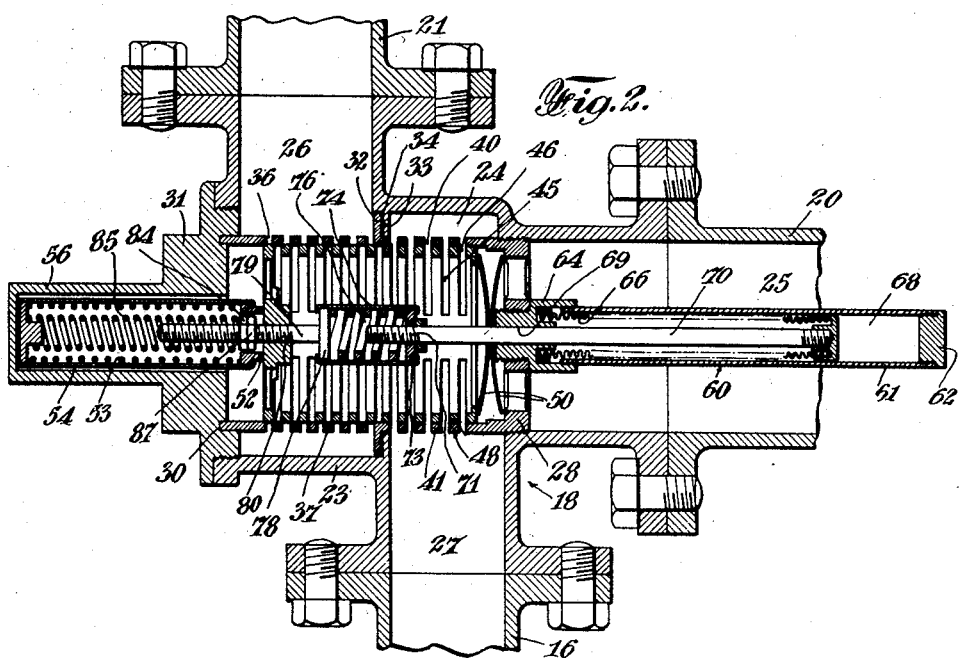
Fig. 2 is a sectional view of the thermally operated valve employed in the system shown in Fig. 1.
Figure 3:
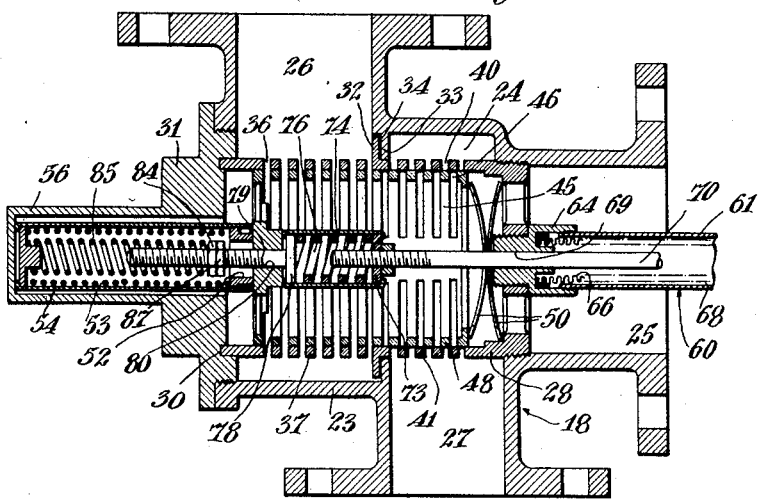
Fig. 3 is a view similar to Fig. 2, but showing the valve in a different position.
Figure 4:
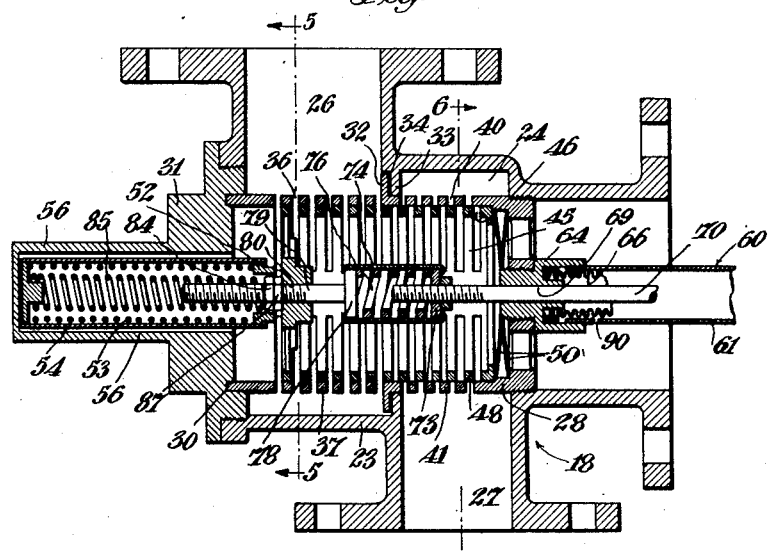
Fig. 4 is a view similar to Fig. 2, but showing the valve in a still different position.
Figure 5:
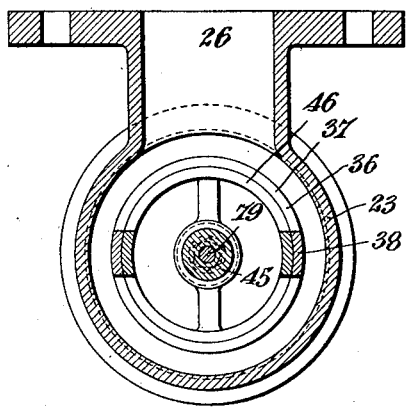
Fig. 5 is a section of the valve taken on the line 5—5 of Fig. 4.
Figure 6:
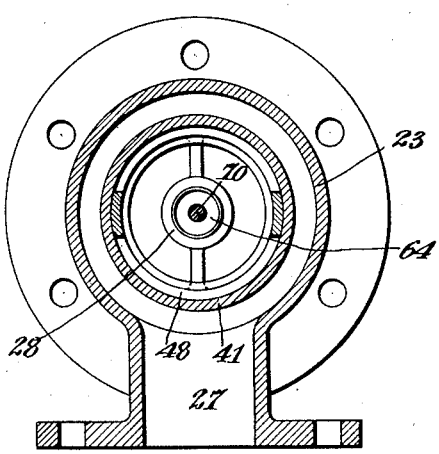
Fig. 6 is a section of the valve taken on the line 6—6 of Fig. 4.

The valve 18 comprises a casing 23 having a valve chamber 24 which communicates at its rear or right hand end, as shown in Figs. 2 to 4, with the pipe 20, through an inlet port or passage 25 adapted to receive water from the engine and also communicates with side passages or ports 26 and 27, passage 26 being located at the forward or left hand end of the chamber and leading up to the radiator pipe 21, and passage 27 at the lower portion of the valve leading down to the by-pass pipe 16. Located in the valve chamber 24 is a hollow cylindrical fixed slotted valve member 28 which is screwed into a casing at the forward end of the inlet port 25 and has its forward end seated in an annular recess 30 in the head 31 of the valve casing. The member 28 is formed with an outwardly extending annular flange 32 which is seated against the inwardly projecting annular flange 33, formed integral with the casing 23; and a gasket 34 is held between the opposing faces of the flanges 32 and 33 so as to prevent leakage of water between these faces. The cylindrical valve member 28 is open at the rear end to the port 25, and the sides are circumferentially slotted in front of the flange 32 as indicated at 36; and also at the rear of the flange 32, as indicated at 40, thus leaving between the slots a series of arc-shaped members 37, in front of the flange 32, and a similar series of arc-shaped members 41 at the rear of the flange 32. These arc-shaped members 37 and 41 are joined together at their ends by the unslotted portions 38 of the side wall of the member 28. Fitted within the member 28 and adapted to move longitudinally thereof is a hollow cylindrical circumferentially slotted vave member 45 open at both ends and formed with a series of slots 46 of similar form to the slots in the fixed member 28, and between the slots 46 a series of arcuate members 48.

When the valve member 45 occupies the position shown in Fig. 2, all of the slots 36 of the fixed member 28 are closed by the arcuate members 48 of the movable valve member 45, and communication between the interior of the member 45 and the radiator outlet passage 26 is cut off. Slots 40 in the fixed member 28 which lie to the rear of flange 32, however, are not closed by the arcuate members 48 and the interior of the member 45 is in free communication with the by-pass outlet port 27. When the valve member 45 is in the position shown in Fig. 3, this condition of affairs is reversed and the interior of the valve member 45 is in free communication with the radiator outlet passage 26 and is cut off from the by-pass passage 27.

With the parts in the position shown in Fig. 2, the valve member is held in the position there shown by spring washers 50, which are interposed between the rear ends of the valve members 28 and 45, and serve to maintain the movable valve member 45 in contact with a bushing 52 that is held by a spring 53 at the forward end of a tube 54 carried in a hollow extension 56 of the valve head 31.

Fig. 2 shows the position of the valve when the motor is cold and it will be seen that water, leaving the motor 10, passes through pipe 20, valve inlet 25 to the interior of the member 45, thence through the slots 40 and 46, outlet 27, by-pass pipe 16 to pipe 15 and thence back to the motor. To move the valve, when the motor becomes heated so that water may pass from the engine to the radiator, I provide a thermostat 60 which, as shown, comprises a tube 61 hermetically sealed at its rear end by a plug 62, and sealed at its forward end to a nipple 64, which is screw threaded into the central portion of the rear end of the stationary valve member 28 which thus forms a support for the thermostat. Sealed at its forward end to the interior of the nipple 64 is a tubular expansible bellows-like member 66 which extends back in the tube 61 and is spaced from the inner wall thereof, so as to form between such wall and the member 66 and beyond the head of the bellows a sealed space adapted to contain a volatile liquid 68. Secured to the rear head of the member 66 and extending through the interior thereof, and through an opening 69 in the nipple 64, is a rod 70 which is screw threaded at its forward end 71 to a collar 73 contained in a tubular member 74. As shown in Fig. 2, the collar 73 is held against the rear end of the tubular member 74 by a spring 76, which bears at one end against the collar 73 and at the other end against the head 78 and a forwardly extending rod 79, which projects through an opening 80 in the forward end of the movable valve member 45 and into the tube 54. A nut 84 carried by the rod 79 is engaged by the rear end of a spring 85, the forward end of which presses against the forward end of the tube 54.

Fig. 2 shows the position of the thermostat 60 at substantially atmospheric temperature. The volatile liquid 68 contained in the tube 61, exerts a vapor or fluid pressure against the inner walls of the tube and against the sides of the end of bellows-shaped member 66, thus tending to collapse the bellows and move the rod 70 forwardly through the nipple 64. The force acting on the rod 70 by reason of the vapor pressure of the liquid 68 is resisted by the spring 85, acting to force the rod 79 rearwardly, that is, toward the right, and this rod, acting through the spring 76 and collar 73, applies to the rod 70 a force which is equal and opposite to the forwardly acting force caused by the vapor or fluid pressure. When the motor is started and warm water begins to flow through the valve inlet 25 into the member 45, and thence through the slots 46 and 40 to the by-pass pipe 16, the liquid in the thermostat 60 becomes heated and exerts a higher vapor or fluid pressure against the head of the bellows-shaped member 66. As a result, member 66 is longitudinally contracted and rod 70 moves forwardly to the left through the nipple 64, and inasmuch as the force exerted by spring 85 is less than that exerted by spring 76, rod 79 is moved with the rod 70 and spring 85 becomes contracted until it exerts a force equal and opposite to the force exerted by the vapor or fluid pressure at the new temperature, tubular member 74 taking up a position somewhat forward, that is, to the left of the position shown in Fig. 2. As the engine heats up and the water passing into the valve inlet 25 becomes more and more heated, rod 70, tubular member 74 and rod 79 continue to move forward until the forward end of the tubular member 74 reaches the forward end of the movable valve member 45. Until this time, the movable valve member 45 has remained in the position shown in Fig. 2, being held in such position by the spring 53, and spring washers 50. After the forward end of the tubular member 74 reaches the forward end of the movable valve member 45, which position may represent a temperature, say, of 170° F. of the water in the inlet 25, further movement of the tubular member 74 forwardly, or to the left, as shown in Fig. 2, will result in the movement of the movable valve member 45 against the pressure of the spring 53 to the position shown in Fig. 3, in which it will be seen that bushing 52 has been moved forwardly into the tube 54, and the forward end of the movable valve member 45 has been brought into engagement with the rear end of the tube 54. In this position of the movable valve member, water entering the member 45 from the inlet 25 cannot pass into the by-pass pipe 16 because the slots 40 have been closed by the members 48 of the movable valve member 45. Water may, however, now flow in the radiator outlet 26 through slots 36 and 46 which are now in alignment. As the water in the valve inlet 25 becomes heated to a still higher temperature, the pressure in the thermostat continues to increase until it exerts a force on the rod 70 sufficient to overcome the oppositely acting force on this rod due to the spring 76. Further increase of the temperature of the water results in a compression in the spring 76 and moves the collar 73 further into the tubular member 74. This further movement of the rod 70 does not move the movable valve member 45 from the position shown in Fig. 3.

When the engine and circulating liquid cools, the reverse action to that above described takes place.

It is, of course, vital, in order to protect the engine from overheating, that a continuous opening through the valve must be insured at all times. Aside from the means already described for limiting the extreme positions of the valve in normal operation, the openings between the arcuate portions of both members of the valve are of the same width and, likewise, the width of the arcuate portions of both members of the valve are the same and also substantially the same as the width of said openings, as shown in the drawings. Consequently, in every position of the valve, there is always a path for the liquid from the inlet through at least one of the outlets.

If, due to injury to or breakage of the thermostat 60, the thermostat becomes ineffective to move the valve member 45 at the desired temperature from the position shown in Fig. 2 to that shown in Fig. 3, this failure might result in serious injury to the engine because the water circulating through the by-pass would not become cool so as to cool the engine, and as a result the engine would quickly become over heated. To prevent this, I provide means operating in case of breakage of the thermostat for automatically moving the valve to open the passage to the radiator and close the passage through the by-pass. The construction and arrangement of the fixed and movable valve members 28 and 45 is such that the movable member 45 may move in the member 28 rearwardly as well as forwardly from the position shown in Fig. 2; and the thermostat and its operating connections are so constructed that at normal or atmospheric temperature, the liquid 68 exerts a force on the rods 70 and 79, and as a result, spring 85 is somewhat compressed at normal temperature. If the thermostat becomes broken, as is indicated at 90 in Fig. 4, so as to permit, for example, the liquid 68 to leak out of the space between the tube 61 and the collapsible member 66, spring 85 acting on nut 84 will move rods 79 and 70 toward the rear, such movement being no longer opposed by the pressure of the fluid 68. As a result, nut 87 on the rod 79 will engage the forward end of the movable valve member 45 and will then move the member 45 against the pressure of springs 50 to the position shown in Fig. 4, in which it will be noted that the slots 40 have been closed by the arcuate members 48 of the valve member 45 and slots 36 and 46 are in alignment, thus preventing passage of water from the valve chamber into the by-pass and permitting the passage of such water into the outlet 26 to the radiator.

While I have shown and described a specific embodiment of my invention, it will be understood that various modifications may be made without departing from the scope of this invention.

I claim:—

A thermostatic valve comprising a casing having three ports, a stationary valve member communicating with two of said ports, a movable valve member communicating with a third of said ports, an expansible and compressible thermostatic device of the bellows-type located in one of said ports for moving said movable valve member, a lost motion connection between said thermostatic device and said movable valve member, a spring opposing the movement of said movable valve member by said thermostatic device, and a second spring for moving said movable valve member to safety position upon breakdown of said thermostatic device.

HERBERT A. SMITH.